(12) United States Patent
Minegishi

(10) Patent No.: US 12,715,959 B2
(45) Date of Patent: Aug. 25, 2026

(54) EPOXY RESIN COMPOSITION AND IGNITION COIL

(71) Applicant: KYOCERA Corporation, Kyoto (JP)

(72) Inventor: Kazuma Minegishi, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 943 days.

(21) Appl. No.: 17/912,607

(22) PCT Filed: Mar. 26, 2021

(86) PCT No.: PCT/JP2021/012924
§ 371 (c)(1),
(2) Date: Sep. 19, 2022

(87) PCT Pub. No.: WO2021/193929
PCT Pub. Date: Sep. 30, 2021

(65) Prior Publication Data

US 2023/0242703 A1 Aug. 3, 2023

(30) Foreign Application Priority Data

Mar. 27, 2020 (JP) ................................ 2020-058442

(51) Int. Cl.
*C08G 59/24* (2006.01)
*C08G 59/42* (2006.01)
(Continued)

(52) U.S. Cl.
CPC ....... *C08G 59/245* (2013.01); *C08G 59/4215* (2013.01); *C08K 3/04* (2013.01);
(Continued)

(58) Field of Classification Search
CPC .... C08G 59/245; C08G 59/4215; C08K 3/04; C08K 3/22; C08K 3/36; C08K 2003/2227; C08K 2201/005; H01B 3/40
(Continued)

(56) References Cited

U.S. PATENT DOCUMENTS

2014/0010979 A1* 1/2014 Tomioka ................ C08L 63/04
525/486
2014/0370213 A1* 12/2014 van der Mee .......... C08L 83/04
524/126

FOREIGN PATENT DOCUMENTS

JP 10-60084 A 3/1998
JP 2000-336249 A 12/2000
(Continued)

*Primary Examiner* — Robert S Jones, Jr.
*Assistant Examiner* — Elizabeth Amato
(74) *Attorney, Agent, or Firm* — Volpe Koenig

(57) ABSTRACT

Provided are an epoxy resin composition that excels in solubility of a coloring agent and can impart a high insulating property without color unevenness in a cured product, and an ignition coil that exhibits an excellent property of impregnation of the epoxy resin composition into the coil and cracking resistance. The epoxy resin composition includes (A) an epoxy resin, (B) an acid anhydride, (C) an inorganic filler, and (D) a coloring agent. A difference between a solubility parameter (SP value) of a mixture of the epoxy resin (A) and the acid anhydride (B) and a solubility parameter (SP value) of the coloring agent (D) as measured by Fedors method is less than 3.1 $[(cal/cm^3)^{1/2}]$. The SP value of the mixture of the epoxy resin (A) and the acid anhydride (B) is calculated from a weighted average of a solubility parameter (SP value) of the epoxy resin (A).

13 Claims, 1 Drawing Sheet

(51) Int. Cl.
*C08K 3/04* (2006.01)
*C08K 3/22* (2006.01)
*C08K 3/36* (2006.01)
*H01B 3/40* (2006.01)

(52) U.S. Cl.
CPC .................. *C08K 3/22* (2013.01); *C08K 3/36* (2013.01); *H01B 3/40* (2013.01); *C08K 2003/2227* (2013.01); *C08K 2201/005* (2013.01)

(58) Field of Classification Search
USPC .......................................................... 523/440
See application file for complete search history.

(56) References Cited

FOREIGN PATENT DOCUMENTS

| | | | | |
|---|---|---|---|---|
| JP | 2015168687 | A | * | 9/2015 |
| JP | 2017-088657 | A | | 5/2017 |

* cited by examiner

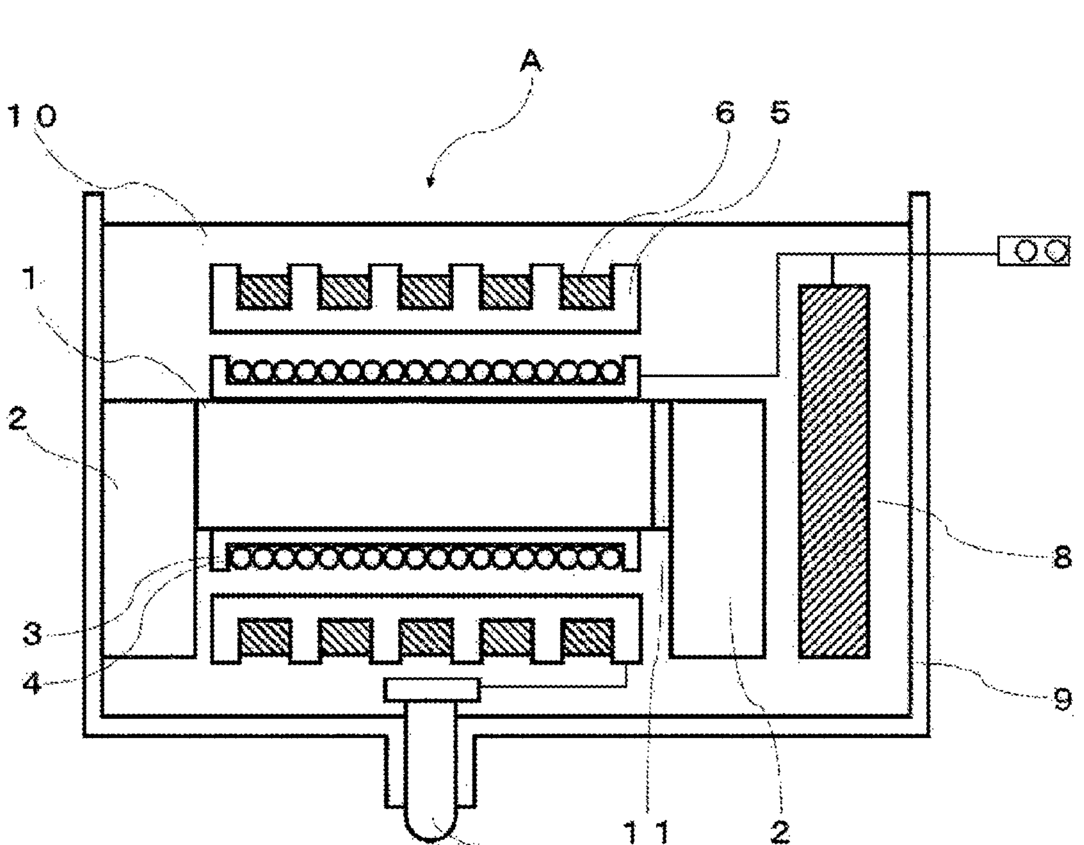
A
10
6
5
1
2
8
3
4
9
11
2
7

EPOXY RESIN COMPOSITION AND IGNITION COIL

TECHNICAL FIELD

The present disclosure relates to an epoxy resin composition and an ignition coil.

BACKGROUND OF INVENTION

Epoxy resin compositions having a high impregnation property and a good electrical insulation property have been widely used in insulation treatments of coils. For example, an acid anhydride-curable epoxy resin composition exhibits excellent mechanical properties, electrical insulation properties, and withstand voltage characteristics at high temperatures (see, for example, Patent Document 1).

In recent years, high voltages have been applied to coils used in automotive devices, and particularly to ignition coils used for ignition in a gasoline engine. Therefore, the demand for improvements in insulation and dielectric breakdown strength is increasing, and epoxy resin compositions having long-term reliability and cured products thereof are being sought.

In addition, epoxy resin compositions are colored for concealing purposes as well as the insulation treatment of a coil, and carbon black, which has a proven track record in coloring, is being used.

CITATION LIST

Patent Literature

Patent Document 1: JP 10-60084 A

SUMMARY

The present disclosure provides the following aspects.

(1) An epoxy resin composition including (A) an epoxy resin, (B) an acid anhydride, (C) an inorganic filler, and (D) a coloring agent. The difference between a solubility parameter (SP value) of a mixture of the epoxy resin (A) and the acid anhydride (B) and a solubility parameter (SP value) of the coloring agent (D) as measured by Fedors method is less than 3.1 $[(cal/cm^3)^{1/2}]$. The SP value of the mixture of the epoxy resin (A) and the acid anhydride (B) is calculated from a weighted average of a solubility parameter (SP value) of the epoxy resin (A) as measured by Fedors method and a solubility parameter (SP value) of the acid anhydride (B) as measured by Fedors method.

(2) An ignition coil insulated with a cured product of the epoxy resin composition described above.

BRIEF DESCRIPTION OF THE DRAWINGS

FIG. 1 is a cross-sectional schematic view illustrating an example of an ignition coil product having a rectangular shape according to an embodiment of the present disclosure.

DESCRIPTION OF EMBODIMENTS

When an epoxy resin composition is colored with carbon black, the insulating properties may decrease when a high voltage is applied. Therefore, an insulating treatment is preferably implemented with a coloring agent that is not electrically conductive, does not have color unevenness, and provides an excellent concealing property.

The present disclosure provides an epoxy resin composition that excels in solubility of a coloring agent and can impart a high insulating property without color unevenness in a cured product, and an ignition coil that exhibits an excellent property of impregnation of the epoxy resin composition into the coil and cracking resistance.

An embodiment for carrying out the present disclosure will be described below.

Epoxy Resin Composition

In an embodiment of the present disclosure, an epoxy resin composition includes (A) an epoxy resin, (B) an acid anhydride, (C) an inorganic filler, and (D) a coloring agent. The difference between a solubility parameter (SP value) of a mixture of the epoxy resin (A) and the acid anhydride (B) and a solubility parameter (SP value) of the coloring agent (D) as measured by Fedors method is less than 3.1 $[(cal/cm^3)^{1/2}]$. The SP value of the mixture of the epoxy resin (A) and the acid anhydride (B) is calculated from a weighted average of a solubility parameter (SP value) of the epoxy resin (A) as measured by Fedors method and a solubility parameter (SP value) of the acid anhydride (B) as measured by Fedors method.

In the present disclosure, the solubility parameter (SP value) is used as an index indicating the hydrophilicity (or hydrophobicity) of the components included in the epoxy resin composition. The solubility parameter (SP value) is a value defined by the regular solution theory introduced by Hildebrand. For example, as the difference between the solubility parameters (SP values) of two components becomes smaller, the solubility becomes greater.

Here, the solubility parameter (SP value) (hereinafter, the solubility parameter may be referred to as the "SP value") according to Fedors method is calculated, for example, by the following equation.

$$\text{Solubility Parameter } (\delta)=(Ev/v)v^{1/2}=(\Sigma\Delta ei/\Delta vi)v^{1/2}$$

(Ev: vaporization energy, v: molar volume, Δei: vaporization energy of the atom or atomic group of a component i, Δvi: molar volume of the atom or atomic group of the component i)

The vaporization energy and the molar volume of the atoms or atomic groups used in calculating the solubility parameter can be obtained by referencing R. F. Fedors, Polym. Eng. Sci., 14, 147 (1974). Values obtained by another method may be used as the solubility parameters as long as the gist of the present disclosure is not changed.

Note that the SP value of the mixture of the epoxy resin of the component (A) and the acid anhydride of the component (B) can be calculated from the weighted average of the SP values of components, that is, from the SP value of each component and the number of moles of each component.

Specifically, the SP value of the mixture thereof can be calculated from the sum of [(the SP value of the epoxy resin of the component (A)×the number of moles of the epoxy resin of the component (A))/(the total number of moles of the epoxy resin of the component (A) and the acid anhydride of the component (B)] and [(the SP value of the acid anhydride of the component (B)×the number of moles of the acid anhydride of the component (B))/(the total number of moles of the epoxy resin of the component (A) and the acid anhydride of the component (B)].

The molecular structure, molecular weight, and the like of the epoxy resin of the component (A) used in the present disclosure are not particularly limited as long as the epoxy resin has two or more epoxy groups per molecule. A commonly used epoxy resin can be used as the epoxy resin.

Examples of the epoxy resin of the component (A) include aromatic epoxy resins such as bisphenol type, novolac type, and biphenyl type aromatic epoxy resins, and alicyclic epoxy resins produced by epoxidation, such as a glycidyl ether type alicyclic epoxy resin of polycarboxylic acid, and cyclohexane derivatives. One of these epoxy resins can be used alone, or two or more of these epoxy resin can be mixed and used.

From the perspective of curability, the epoxy equivalent weight of the epoxy resin of the component (A) may be in a range of from 150 to 230, or may be in a range of from 160 to 200.

The epoxy resin of the component (A) may be a liquid at ambient temperature (25° C.).

In the present disclosure, from the perspective of solubility with the acid anhydride of the component (B) and the coloring agent of the component (D), the SP value of the epoxy resin of the component (A) may be from 9.0 to 15.0, from 9.5 to 14.0, or from 9.8 to 13.0.

As examples of epoxy resins satisfying these SP values, bisphenol F type epoxy resin (jER (trade name) 807: product name, available from Mitsubishi Chemical Corporation, epoxy equivalent weight: from 160 to 175, SP value: 11.0) and bisphenol A type epoxy resin (jER (trade name) 828EL: product name, available from Mitsubishi Chemical Corporation, epoxy equivalent weight: from 184 to 194, SP value: 10.1) can be procured as commercially available products.

To prepare the viscosity of the epoxy resin composition, a liquid monoepoxy resin or the like can be used as necessary. To impart flame resistance, an epoxy resin modified with a halogen compound, a phosphorus compound, or the like can be used.

From the perspectives of curability and cured product properties, the content of the component (A) in the epoxy resin composition may be from 10 to 40 mass %, from 15 to 35 mass %, or from 20 to 30 mass %. When the content of the component (A) is 10 mass % or more, an appropriate viscosity can be achieved and a decrease in workability can be reduced. When the content of the component (A) is 40 mass % or less, a decrease in the mechanical strength of the cured product can be reduced.

The acid anhydride of the component (B) used in the present disclosure can be used without any particular limitations as long as the acid anhydride has an acid anhydride group in the molecule and is one that is usually used as a curing agent for an epoxy resin. Examples of the acid anhydride of the component (B) include alicyclic acid anhydrides such as methylhexahydrophthalic anhydride (Me-HHPA), methyltetrahydrophthalic anhydride (Me-THPA), and tetrahydrophthalic anhydride (THPA); aromatic acid anhydrides such as phthalic anhydride; and aliphatic acid anhydrides such as aliphatic dibasic acid anhydride (PAPA). An alicyclic acid anhydride may be used as the acid anhydride.

From the perspective of solubility with the component (A) and the component (D), the SP value of the acid anhydride of the component (B) may be from 11.0 to 16.0, from 11.5 to 15.5, or from 12.0 to 15.0. For example, methylhexahydrophthalic anhydride (HN5500E: product name, available from Hitachi Chemical Co., Ltd., SP value: 12.5), methyltetrahydrophthalic anhydride (HN2200: product name, available from Hitachi Chemical Co., Ltd., SP value: 13.0), and a mixture of methyl-3,6-endomethylene-1,2,3,6-tetrahydrophthalic anhydride and 3,6-endomethylene-1,2,3,6-tetrahydrophthalic anhydride (MHAC-P: product name, available from Hitachi Chemical Co., Ltd., SP value: 14.7) can be procured as commercially available products.

The content of the component (B) in the epoxy resin composition may be from 6 to 40 mass %, from 10 to 35 mass %, or from 15 to 30 mass %. When the content of the component (B) is 6 mass % or higher, curing of the resin sufficiently advances. When the content thereof is 40 mass % or less, sufficient heat resistance can be obtained.

The content of the acid anhydride of the component (B) may be such that a ratio [(a)/(b)] of the number of epoxy groups (a) in the epoxy resin of the component (A) to the number of acid anhydride groups (b) in the acid anhydride of the component (B) is from 0.5 to 1.5, or from 0.8 to 1.2.

When the ratio [(a)/(b)] is 0.5 or higher, the moisture resistance reliability of the cured product is improved. When the ratio [(a)/(b)] is 1.5 or less, a decrease in strength of the cured product can be reduced.

From the perspective of solubility with the coloring agent of the component (D), the SP value of the mixture of the epoxy resin of the component (A) and the acid anhydride of the component (B) may be 15.0 or less, from to 14.5, or from 11.0 to 14.0.

As the inorganic filler of the component (C) used in the present disclosure, any inorganic filler can be used without particular limitation as long as the inorganic filler is an inorganic filler that is ordinarily used in an automotive ignition coil. For example, silica, alumina, magnesia, boron nitride, aluminum nitride, silicon nitride, talc, calcium carbonate, titanium white, and aluminum hydroxide can be used. The inorganic filler may be silica from the perspective of the dielectric breakdown strength. As the silica, crushed fused silica, spherical fused silica, crystalline silica, and the like can be used.

One of these inorganic fillers can be used alone, or two or more of these inorganic fillers can be mixed and used.

A commercially available product can be used as the silica. Examples of the crushed fused silica include Fuselex RD-8 (product name, available from Tatsumori Ltd., average particle size: 18 μm), Fuselex E-2 (product name, available from Tatsumori Ltd., average particle size: 6 μm), and Fuselex WX (product name, available from Tatsumori Ltd., average particle size: 1 μm). Examples of the spherical fused silica include FB-5D (product name, available from Denka Co., Ltd., average particle size: 6 μm), FB-959 (product name, available from Denka Co., Ltd., average particle size: 18 μm), MSR15 (product name, available from Tatsumori Ltd., average particle size: 15 μm), and MSR25 (product name, available from Tatsumori Ltd., average particle size: 25 μm). Examples of the crystalline silica include Crystalite 5X (product name, available from Tatsumori Ltd., average particle size: 1.5 μm), Crystalite A-A (product name, available from Tatsumori Ltd., average particle size: 6 μm), Crystalite C (product name, available from Tatsumori Ltd., average particle size: 20 μm), and Crystalite CMC-12S (product name, available from Tatsumori Ltd., average particle size: 6.1 μm).

From the perspectives of fluidity and workability, the average particle size of the inorganic filler of the component (C) may be from 0.1 to 40 μm, or from 0.5 to 30 μm.

Note that the average particle size indicated above is the particle size (volume average particle size d50) indicated by the 50 mass % value on a volume accumulation curve determined by a laser method-based particle measuring instrument by a method in accordance with JIS Z8825 (2013).

The epoxy resin composition may include a metal hydroxide as the inorganic filler C). The metal hydroxide can be used as a sedimentation inhibitor. The amount of moisture adhering to the metal hydroxide in the component (C) may be from 0.1 to 0.5 mass %, from 0.15 to 0.45 mass %, or from 0.2 to 0.4 mass %. When the amount of moisture adhered to the metal hydroxide in the component (C) is within this range, sedimentation of the inorganic filler can be reduced.

Note that the amount of moisture adhered to the metal hydroxide in the component (C) can be measured in accordance with JIS K 0067 (1992), and specifically, the adhered moisture amount can be measured by the method described in the examples.

The amount of moisture adhered to the metal hydroxide in the component (C) can be prepared within the above range by heating and drying the metal hydroxide of the component (C) or absorbing the moisture of the metal hydroxide thereof.

The metal hydroxide in the component (C) is not particularly limited as long as the adhered moisture amount is within the range described above. For example, aluminum hydroxide, magnesium hydroxide, calcium hydroxide, manganese hydroxide, and zinc hydroxide can be used. From the perspectives of versatility and manufacturing ease, the metal hydroxide may be aluminum hydroxide.

From the perspective of dispersibility in the epoxy resin composition, the average particle size of the metal hydroxide in the component (C) may be from 0.1 to 5 μm, or may be from 0.5 to 2.5 μm. When the average particle size is 0.1 μm or more, the metal hydroxide can impart adequate thixotropy. When the average particle size is 5 μm or less, the sedimentation rate is reduced due to the particle size of the metal hydroxide of the component (C).

Note that in the present disclosure, the average particle size is the particle size (volume average particle diameter d50) indicated by the 50 mass % value on a volume accumulation curve determined by a laser method-based particle measuring instrument by a method in accordance with JIS Z8825 (2013).

The content of the metal hydroxide in the component (C) may be from 2 to 30 mass %, from 5 to 27 mass %, or from 8 to 20 mass %. When the content is 2 mass % or more, the sedimentation property of the inorganic filler of the component (C) can be reduced. When the content is 30 mass % or less, a low viscosity can be maintained and the impregnation property can be ensured.

The content of the inorganic filler of the component (C) in the epoxy resin composition may be from 30 to 70 mass %, from 35 to 65 mass %, or from 40 to 60 mass %. When the content of the inorganic filler of the component (C) is 30 mass % or more, the epoxy resin composition has favorable insulation reliability. When the content is 70 mass % or less, the epoxy resin composition has favorable impregnation property.

The coloring agent of the component (D) used in the present disclosure may have at least one functional group selected from the group consisting of an amino group, an alkylamino group, an imino group, an azo group, a nitro group, a cyano group, an amide group, an alkoxy group, a thiol group, and a hydroxy group.

Examples of the alkylamino group include an amino group that is a mono-substituted product of a linear or branched C1-4 alkyl group, such as a methylamino group, an ethylamino group, an n-propylamino group, an isopropylamino group, an n-butylamino group, a sec-butylamino group, and a tert-butylamino group; and an amino group that is di-substituted product of a linear or branched C1-4 alkyl group, such as a dimethylamino group, a methylethylamino group, a diethylamino group, and a dibutylamino group.

Examples of the alkoxy group include a linear or branched C1-4 alkoxy group, such as a methoxy group, an ethoxy group, an n-propoxy group, an isopropoxy group, an n-butoxy group, a sec-butoxy group, and a tert-butoxy group.

Since the coloring agent of the component (D) has the functional group described above, the functional group forms a hydrogen bond with the adhered moisture of the metal hydroxide in the component (C) described above, and thereby dispersibility can be improved. The viscosity of the epoxy resin composition can be further increased and fall within a viscosity range in which sedimentation of the inorganic filler of the component (C) can be reduced. From such a perspective, the functional group of the coloring agent of the component (D) may be an amino group, an alkylamino group, a nitro group, an amide group, a thiol group, or a hydroxy group, or may be an amino group, alkylamino group, or a hydroxy group.

The coloring agent of the component (D) is not particularly limited as long as the coloring agent has a functional group described above. Examples of the coloring agent include an organic dye, such as an anthraquinone-based dye, a methine-based dye, an azo-based dye, an azomethine-based dye, a phthalocyanine-based dye, a quinone imine-based dye, a quinoline-based dye, and a nitro-based dye; and an organic pigment, such as an azo-based pigment, a triphenylmethane-based pigment, a quinoline-based pigment, an anthraquinone-based pigment, a phthalocyanine-based pigment, and a quinacridone-based pigment. From the perspective of solubility, the coloring agent may be one or more selected from the group consisting of an anthraquinone-based dye, a methine-based dye, and an azomethine-based dye.

A commercially available product can be used as the coloring agent of the component (D). Examples of red coloring agents include Solvent Red 146 (anthraquinone-based, SP value: 15) and Solvent Red 111 (anthraquinone-based, SP value: 13.8); examples of yellow coloring agents include Solvent Yellow 33 (quinophthalone-based, SP value: 15.0) and Solvent Yellow 93 (methine-based, SP value: 13.2); examples of blue coloring agents include Solvent Blue 104 (anthraquinone-based, SP value 12) and Solvent Violet 13 (anthraquinone-based, SP value 12.3); and examples of green coloring agents include Solvent Green 3 (anthraquinone-based, SP value 12.1). Other examples of commercially available coloring agents include Chromofine Black A1103 (product name, available from Dainichiseika Color & Chemicals Mfg Co., Ltd., SP value: 15.6), and as a premixed commercially available product, Kayaset Black G (product name, available from Nippon Kayaku Co., Ltd., SP value: 12.7).

One of these coloring agents can be used alone, or two or more of these coloring agent can be mixed and used.

The color of the coloring agent of the component (D) is not particularly limited. As one variation, the cured product formed from the epoxy resin composition may be colored black.

As another variation, an epoxy resin composition produced by mixing two or more types of coloring agents may be black.

It should be noted that the carbon black used for black coloration in known methods does not dissolve in the epoxy resin composition. Carbon black does not have an SP value, and thus is not included as a coloring agent of the component (D).

From the perspective of solubility with the component (A) and the component (B), in accordance with Fedors method, the solubility parameter (SP value) of the coloring agent of the component (D) used may be 16.0 or less, may be from 10.0 to 15.5, or may be from 11.0 to 15.0.

When the SP value of the coloring agent of the component (D) is within this range, the difference between the SP value of the coloring agent of the component (D) and the SP value of the mixture of the epoxy resin of the component (A) and the acid anhydride of the component (B) is easily prepared so as to be within the stipulated range of the present disclosure.

The content of the coloring agent of the component (D) in the epoxy resin composition may be from 0.02 to 1 mass % or from 0.05 to 0.5 mass %. When the content of the coloring agent of the component (D) is within a range of from 0.02 to 1 mass %, a sufficient coloration for concealment can be obtained.

The difference between the SP value of the mixture of the epoxy resin (A) and the acid anhydride (B) and the SP value of the coloring agent (D) is less than 3.1 $[(cal/cm^3)^{1/2}]$. When the difference between the SP value of the mixture of the epoxy resin (A) and the acid anhydride (B) and the SP value of the coloring agent (D) is 3.1 $[(cal/cm^3)^{1/2}]$ or more, the coloring agent of the component (D) is less likely to dissolve sufficiently in the epoxy resin of the component (A) and the acid anhydride of the component (B). If the SP value of the mixture of the component (A) and the component (B) changes in advanced solidification through curing, the difference between the SP value of the mixture of the epoxy resin (A) and the acid anhydride (B) and the SP value of the component (D) increases even further, and the component (D) is more easily precipitated. This may lead to color unevenness or the generation of cracks in the cured product.

The difference between the SP value of the mixture of the epoxy resin (A) and the acid anhydride (B) and the SP value of the coloring agent (D) may be less than 3.1, less than 2.8, or less than 2.6. The difference between the SP value of the mixture and the SP value of the coloring agent (D) may even be 0.

When the difference between the SP value of the mixture and the SP value of the coloring agent is less than 3.1, the coloring agent of the component (D) is sufficiently dissolved in the epoxy resin of the component (A) and the acid anhydride of the component (B). Even when the SP value of the mixture of the component (A) and the component (B) changes due to polymerization of the mixture through curing, the difference between the SP value of the mixture and the SP value of the component (D) is not too large. As a result, the coloring agent is not precipitated even in the course of curing, and the coloring agent becomes uniformly dispersed in the resin cured product.

The epoxy resin composition may include a curing accelerator. As the curing accelerator used, a curing accelerator ordinarily used in the curing of an epoxy resin can be used. Examples of the curing accelerator include N,N-dimethylbenzylamine, 2,4,6-tris(dimethylaminomethyl)phenol, 2-ethyl-4-methylimidazole (2E4MZ), and quaternary ammonium salts. From the perspective of curability, N,N-dimethylbenzylamine or 2-ethyl-4-methylimidazole (2E4MZ) may be used as the curing accelerator.

Commercially available products can be used as the N,N-dimethylbenzylamine. Examples of such curing accelerators include Kaolizer No. 20 (product name, available from Kao Corporation). Examples of the 2-ethyl-4-methylimidazole include Curezol 2E4MZ (product name, available from Shikoku Chemicals Corporation). One of these curing accelerators can be used alone, or two or more of these curing accelerators can be mixed and used.

The content of the curing accelerator may be from 0.1 to 5 parts by mass, or from 0.2 to 3 parts by mass, per 100 parts by mass of the acid anhydride of the component (B). When the content of the curing accelerator is 0.1 parts by mass or more, the curability of the epoxy resin composition becomes more favorable. When the content of the curing accelerator is 5 parts by mass or less, the pot life of the epoxy resin composition can be lengthened.

The epoxy resin composition may include a coupling agent. When the epoxy resin composition includes a coupling agent, the surface of the inorganic filler of the component (C) is modified, and the epoxy resin composition has favorable insulation reliability.

Examples of the coupling agent include silane coupling agents, titanium-based coupling agents, and aluminum-based coupling agents. From the perspectives of moisture resistance and improving strength, the coupling agent may be a silane coupling agent, or an epoxy silane coupling agent.

Examples of epoxy silane coupling agents include γ-glycidoxypropyltriethoxysilane (product name: KBE-402, available from Shin-Etsu Chemical Co., Ltd.), γ-glycidoxypropyltrimethoxysilane (product name: A-187, available from NUC Corporation), and β-(3,4-epoxycyclohexyl)ethyltrimethoxysilane (product name: A-186, available from NUC Corporation). One of these coupling agents can be used alone, or two or more of these coupling agents can be mixed and used.

When a coupling agent is used, the content of the coupling agent in the epoxy resin composition may be from 0.01 to 3 mass %, or from 0.05 to 1 mass %. When the content of the coupling agent is 0.01 mass % or more, the surface of the inorganic filler of the component (C) is modified. When the content of the coupling agent is 3 mass % or less, the sedimentation rate of the inorganic filler of the component (C) is reduced.

In addition to the components described above, the epoxy resin composition can include, as necessary and within a limit that is not contrary to the spirit of the present disclosure, other components generally included in this type of epoxy resin composition. Examples of such components include defoamers, antioxidants, and sedimentation inhibitors.

The total content of the components (A) to (D) included in the epoxy resin composition may be from 80 to 100 mass %, from 85 to 100 mass %, or from 90 to 100 mass %.

The epoxy resin composition can be produced by mixing the epoxy resin (A), the acid anhydride (B), the inorganic filler (C), and the coloring agent (D), and also other optional components that are included as necessary.

Here, the epoxy resin composition can be a two liquid component-type epoxy resin composition including a first component (main agent) and a second component (curing agent). When a two liquid component-type epoxy resin composition is used, the first component and the second component are mixed at the time of use.

Examples of the two liquid component-type epoxy resin composition include an epoxy resin composition including a first component including an epoxy resin (A), an inorganic filler (C), and a coloring agent (D), and a second component including an acid anhydride (B).

The viscosity at 25° C. of the epoxy resin composition may be from 10 dPa·s to 100 dPa·s, or from 20 dPa·s to 95 dPa·s. The viscosity at 70° C. of the first component may be from 100 dPa·s to 1000 dPa·s, or from 200 dPa·s to 900 dPa·s.

Note that the viscosity of the epoxy resin composition and the viscosity of the first component are both values measured using a B-type viscometer at a rotational speed of 1.5 rpm.

The epoxy resin composition exhibits favorable impregnability into a coil and has an insulating property that is sufficiently applicable in an ignition coil application. The epoxy resin composition also exhibits solubility with respect to a coloring agent and dispersibility with respect to an inorganic filler, and thus the epoxy resin composition can be used as a resin for a vehicle-mounted ignition coil.

The epoxy resin composition is used, for example, in the manufacturing of a mold coil by impregnating the epoxy resin composition into a coil in which a coated copper wire is wound, and then curing the epoxy resin composition. Examples of the impregnation method include a method of impregnating through casting. Examples of the curing method include a method of curing by heating.

The mold coil is not particularly limited, and examples include transformers such as a high-voltage transformer. A specific example of the mold coil is an ignition coil for an automobile. The ignition coil is produced by impregnating, with an epoxy resin composition, a coil body having a primary coil and a secondary coil provided on a magnetic core and then curing the epoxy resin composition.

Ignition Coil

As one variation, the epoxy resin composition may be a resin composition for an ignition coil.

The ignition coil is insulated by a cured product of the epoxy resin composition.

The epoxy resin composition is used to manufacture the ignition coil, and thereby the characteristics of the epoxy resin composition are exhibited, and an ignition coil having high insulation reliability can be easily produced. Typically, the occupied volume of the epoxy resin composition in the ignition coil may be 30 vol % or less.

Examples of the ignition coil include an ignition coil having a pen shape and an ignition coil having a rectangular shape. With the ignition coil having a pen shape, a coil body is impregnated with an epoxy resin composition, the epoxy resin composition is cured, and the coil body is then housed in a cylindrical plastic case. The coil body used in such an ignition coil having a pen shape is configured from, for example, a magnetic core, an external core, a primary bobbin, a primary coil, a secondary bobbin, a secondary coil, a case, and a terminal, and a coated lead wire having a diameter of 50 μm or less is wound onto the coil. Also, an example of the plastic case is one having a diameter of 2.0 cm or less.

In addition, the ignition coil having a rectangular shape is an ignition coil in which a coil body is impregnated with an epoxy resin, the epoxy resin is cured, and the coil body is then housed in a box-shaped plastic case. The coil body used in such an ignition coil having a rectangular shape is, for example, one in which a coated lead wire having a diameter of 30 μm or less or 50 μm or less is wound onto a magnetic core. Also, an example of the plastic case is one that is approximately 4.0 cm square.

FIG. 1 is a cross-sectional schematic view illustrating an example of an ignition coil product having a rectangular shape according to an embodiment of the present disclosure. As illustrated in FIG. 1, a coil A has a center core 1, an outer core 2, a primary bobbin 3, a primary coil 4, a secondary bobbin 5, a secondary coil 6, a terminal 7, an igniter 8, and a magnet 11 fixed inside a case 9. The epoxy resin composition 10 described above is cast into a void between the case 9 and the center core 1 and then heated and cured.

Next, a method for manufacturing an ignition coil in which the epoxy resin composition is used will be described. The ignition coil can be manufactured by subjecting the epoxy resin composition to a vacuum impregnation treatment. The vacuum impregnation treatment is implemented, for example, by injecting the epoxy resin composition into a coil housed in a case, and then carrying out the vacuum impregnation treatment (reduced pressure impregnation treatment). Pressurization may be implemented after the vacuum impregnation treatment. At this time, the vacuum impregnation treatment may be implemented, for example, at a temperature of from 40 to 80° C. and a pressure of from 133 to 532 Pa for a time of from 1 to 20 minutes using, as the ignition coil prior to casting, an ignition coil that has been preheated for 2 hours at a temperature of from 100 to 120° C. The vacuum impregnation treatment may be implemented at a pressure of from 266 Pa to 399 Pa. In addition, if pressurization is implemented, the pressurization may be implemented, for example, at a temperature of from 40 to 80° C. and a pressure of from $2\times10^1$ to $10\times10^1$ Pa for a time of from 5 to 30 minutes. The curing process may be implemented, for example, at ordinary pressure and a temperature of from 40 to 150° C. for a time of from 4 to 7 hours. The curing temperature and curing time may be set in a stepwise manner.

EXAMPLES

Next, the present disclosure will be specifically described through examples; however, the present disclosure is not limited in any way to these examples.

Preparation Example 1: Preparation of Adhered Moisture Amount of Inorganic Filler (C)

As the metal hydroxide included in the inorganic filler of component (C), 300 g of aluminum hydroxide (product name: H42M, available from Showa Denko K. K., average particle size: 1.5 μm) was extracted and then heated and dried at a temperature of 120° C. until the amount of moisture was reduced to 0.2 mass %, and aluminum hydroxide (adhered moisture amount: 0.2 mass %) was produced.

Example 1

As presented below, a two liquid component-type epoxy resin composition formed from a first component and a second component was produced, and the first component and the second component were mixed at the time of use.

The first component was produced by inserting, into a universal mixer heated to 120° C., 25.5 parts by mass of a bisphenol A type epoxy resin (jER (trade name) 828EL, available from Mitsubishi Chemical Corporation, epoxy equivalent weight: from 184 to 194, SP value: 10.1) as the epoxy resin of the component (A), 45 parts by mass of crystalline silica (product name: Crystalite CMC-12S, available from Tatsumori Ltd., average particle size: 6.1 μm) as the inorganic filler of the component (C), 8 parts by mass of the aluminum hydroxide prepared in Preparation Example 1 (adhered moisture amount: 0.2 mass %, average particle size: 1.5 μm) as the metal hydroxide, 0.1 parts by mass of (d-1) (a mixture of an anthraquinone-based dye and a methine-based dye) (product name: Kayaset Black G, available from Nippon Kayaku Co., Ltd., SP value 12.7) as the coloring agent of the component (D), 0.15 parts by mass of a silane coupling agent (product name: A-187, available from NUC Corporation), and 0.05 parts by mass of a defoamer (product name: TSA720, available from Momentive Inc.), and then mixing the materials for 2 hours under vacuum conditions.

The second component was produced by inserting, into a universal mixer heated to 60° C., 21 parts by mass of methylhexahydrophthalic anhydride (product name: HN5500E, available from Hitachi Chemical Co., Ltd., SP value of 12.5) as the acid anhydride of the component (B) and 0.2 parts by mass of N,N-dimethylbenzylamine (product name: Kaolizer No. 20, available from Kao Corporation) as a curing accelerator, and then mixing for 0.5 hours at ordinary pressure.

The first component heated to 80° C. and the second component at ambient temperature (25° C.) were inserted into the universal mixer at a predetermined ratio and stirred for 15 minutes under a reduced pressure environment of 0.1 MPa or less, and an epoxy resin composition for evaluation was produced.

Examples 2 to 12, Comparative Examples 1 to 4

Epoxy resin compositions for evaluation as shown in Tables 1 and 2 were produced in the same manner as in Example 1 by compounding each of the components at the respective parts by mass indicated in Tables 1 and 2.

Note that the following components are components, other than those described above, that were used in the production of the epoxy resin compositions for evaluation of Examples 2 to 12 and Comparative Examples 1 to 4.

First Component

Epoxy Resin

Component (A)

jER (trade name) 807: product name, bisphenol F type epoxy resin, available from Mitsubishi Chemical Corporation, epoxy equivalent weight: from 160 to 175, SP value 11.0

Inorganic Filler

Component (C)

Fuselex E-2: product name, available from Tatsumori Ltd., fused silica, average particle size: 6 μm Coloring Agent Component (D)

Coloring agent (d-2) [Solvent Red 146] (anthraquinone-based): available from Kiwa Chemical Industry Co., Ltd., SP value of 15.0

Coloring agent (d-3) [Disperse Red 22] (anthraquinone-based): available from Kiwa Chemical Industry Co., Ltd., SP value of 13.6

Coloring agent (d-4) [Solvent Yellow 163] (anthraquinone-based): available from Kiwa Chemical Industry Co., Ltd., SP value of 13.5

Coloring agent (d-5) [Solvent Yellow 33] (quinophthalone-based): available from Kiwa Chemical Industry Co., Ltd., SP value of 15.0

Coloring agent (d-6) [Solvent Green 3] (anthraquinone-based): available from Kiwa Chemical Industry Co., Ltd., SP value of 12.1

Coloring agent (d-7) [Solvent Green 5] (perylene-based): available from Kiwa Chemical Industry Co., Ltd., SP value of 12.0

Coloring agent (d-8) [Solvent Blue 104] (anthraquinone-based): available from Kiwa Chemical Industry Co., Ltd., SP value of 12.0

Coloring agent (d-9) [Solvent Violet 31] (anthraquinone-based): available from Kiwa Chemical Industry Co., Ltd., SP value of 15.8

Coloring Agent Other Than Component (D)

MA600 (carbon black): product name, available from Mitsubishi Chemical Corporation Sedimentation inhibitor: product name: S-BEN, available from Nihon Yuukinendo Co., Ltd.

Second Component

Acid Anhydride

Component (B)

Tetrahydrophthalic anhydride (product name: HN2200, available from Hitachi Chemical Co., Ltd., SP value of 13.0)

Mixture of methyl-3,6-endomethylene-1,2,3,6-tetrahydrophthalic anhydride and 3,6-endomethylene-1,2,3,6-tetrahydrophthalic anhydride (product name: MHAC-P, available from Hitachi Chemical Co., Ltd., SP value of 14.7)

Next, the epoxy resin compositions for evaluation of the examples and comparative examples were subjected to the following evaluations. The results are shown in Tables 1 and 2.

Evaluation Items

Epoxy Resin Composition Evaluation (1) Viscosity

The viscosity of the first component was measured using a B-type viscometer under conditions including a temperature of 70° C. and a rotational speed of 1.5 rpm. The viscosity of the epoxy resin composition produced by mixing the first component and the second component was measured using the B-type viscometer under conditions including a temperature of 25° C. and a rotational speed of 1.5 rpm.

(2) Solubility of Coloring Agent in First Component 0.2 g of the first component was placed on a glass plate, and was sandwiched with a prepared slide put on the upper part, and the first component was then observed with a microscope (500× magnification). The first component was observed at the initial stage and at regular time intervals, and changes in dispersion up to 1000 hours were observed and evaluated according to the following criteria.

[Solubility Evaluation Criteria]

Pass: No precipitation at 1000 hours

Fail: Precipitated in less than 1000 hours (3) Sedimentation Property of Inorganic Filler in First Component 1 kg of the first component was poured into a 1 L round can (diameter of 110 mm) and left standing at 100° C. for 24 hours. After the first component was left standing, the height from the bottom surface of the round can of the inorganic filler layer sedimented on the bottom of the round can was measured using a stainless-steel ruler such that the layer thickness represented the sedimentation property, and the sedimentation property was evaluated according to the following criteria.

[Sedimentation Property Evaluation Criteria]

Excellent: No sediment present

Good: Sediment thickness less than 1 mm

Poor: Sediment thickness of 1 mm or more (4) Gelling Time

A test tube in which 10 g of the epoxy resin composition was poured was inserted into an oil bath at 140° C., and the time required for the epoxy resin composition to cure was measured.

Evaluation of Cured Product (1) Glass Transition Temperature

The epoxy resin composition was heated at 100° C. for 3 hours, and then at 140° C. for 3 hours, and a cured product was produced. The cured product was measured by the TMA method in which the temperature of the cured product produced was increased from room temperature (25° C.) to 185° C. at a temperature elevation rate of 15° C./minute.

(2) Dielectric Breakdown Strength

The epoxy resin composition was heated at 100° C. for 3 hours, and then at 140° C. for 3 hours, and a cured product was produced. The dielectric breakdown voltage of the cured product produced was measured at a temperature of 25° C. in accordance with JIS C2110-1(2010) using a dielectric breakdown tester available from Tokyo Seiden Co., Ltd., and the dielectric breakdown strength was calculated by dividing the dielectric breakdown voltage by the thickness of the cured product.

(3) Volume Resistivity

The epoxy resin composition was heated at 100° C. for 3 hours, and then at 140° C. for 3 hours, and a cured product was produced. The volume resistivity of the cured product produced was measured at a temperature of 25° C. by applying a voltage of DC 500 V in accordance with JIS C 2110-1 (2010). The 4329A High Resistance Meter (product name) available from Yokogawa Hewlett-Packard was used to measure the volume resistivity.

(4) Color

The epoxy resin composition was heated at 100° C. for 3 hours, and then at 140° C. for 3 hours, and a cured product was produced. The color was identified by visually observing the cured product produced.

(5) Color Unevenness

The epoxy resin composition was heated at 100° C. for 3 hours, and then at 140° C. for 3 hours, and a cured product was produced. The color unevenness (difference in brightness of the outer appearance) of the cured product produced was visually observed and evaluated according to the following criteria.

[Color Unevenness Evaluation Criteria]

Pass: No color unevenness is observed.

Fail: Color unevenness can be observed.

Coil Evaluation (1) Impregnation Property

The first component was heated at 100° C. for 1 hour and the second component at 40° C. for 1 hour, after which the first component and the second component were mixed and stirred at 60° C. for 10 minutes to obtain an epoxy resin composition. The obtained epoxy resin composition was impregnated into a test coil (winding diameter: 40 μm, number of turns: 22000) through vacuum injection, and the epoxy resin composition was heated and cured at 100° C. for 3 hours and then at 140° C. for 3 hours. Subsequently, the test coil having the epoxy resin composition for evaluation impregnated and cured was cut, and the cross-section thereof was observed to determine the surface area of the impregnated portion impregnated with the epoxy resin composition and the surface area of the non-impregnated portion not impregnated with the epoxy resin composition. The impregnation rate was determined by the following equation and evaluated according to the following criteria.

Impregnation rate (%)=((surface area of impregnated portion)/(surface area of impregnated portion+surface area of non-impregnated portion))×100

[Impregnation Property Evaluation Criteria]

Excellent: Impregnation rate of 99% or more

Good: Impregnation rate of from 95% to less than 99%

Poor: Impregnation rate less than 95%

(2) Cracking Resistance (Reliability)

A test coil was prepared by housing, in a case having a pen shape (product name: FZ2140, available from DIC Corporation, length of 40 mm, width of 30 mm, depth of 30 mm, thickness of 1 mm, material: PPS), a coil body having a coil (diameter: 40 μm, number of turns: 22000, material: enamel wire) provided on a bobbin (product name: IGN5531, available from SABIC, diameter: 11 mm, material: PPE). The epoxy resin composition for evaluation was impregnated into this test coil by vacuum injection, and the epoxy resin composition was heated and cured at 100° C. for 3 hours, and then at 140° C. for 3 hours. Subsequently, a cooling-heating cycle was implemented one cycle of which included holding the impregnated test coil at −30° C. for 1 hour and then at 140° C. for 1 hour, and the number of cycles required until cracking occurred in a portion formed from the epoxy resin composition for evaluation was measured, and the cracking resistance was evaluated according to the following criteria.

[Cracking Resistance (Reliability) Evaluation Criteria]

Excellent: Number of cycles until cracking occurs is 150 or more

Good: Number of cycles until cracking occurs is from 100 to less than 150

Poor: Number of cycles until cracking occurs is less than 100

TABLE 1

| | | | | SP Value | Molecular | Examples | | |
|---|---|---|---|---|---|---|---|---|
| | | | | (cal/cm$^3$)$^{1/2}$ | Weight | 1 | 2 | 3 |
| Composition | First component (parts by mass) | (A) Epoxy resin | jER828 (trade name) | 10.1 | 380 | 25.5 | 25.5 | |
| | | | jER807 (trade name) | 11.0 | 340 | | | 25.5 |
| | | (C) Inorganic filler | Crystalline silica: Crystalite CMC-12S | | | 45 | 45 | 45 |
| | | | Fused silica: Fuselex E-2 | | | | | |
| | | | Aluminum hydroxide | | | 8 | 8 | 8 |
| | | (D) Coloring agent | (d-2) Solvent Red 146 (anthraquinone-based) | 15.0 | | | | |
| | | | (d-3) Disperse Red 22 (anthraquinone-based) | 13.6 | | | | |
| | | | (d-4) Solvent Yellow 163 (anthraquinone-based) | 13.5 | | | | |
| | | | (d-5) Solvent Yellow 33 (quinophthalone-based) | 15.0 | | | | |
| | | | (d-6) Solvent Green 3 (anthraquinone-based) | 12.1 | | | | |

TABLE 1-continued

| | | | | | | | | |
|---|---|---|---|---|---|---|---|---|
| | | | (d-7) Solvent Green 5 (perylene-based) | 12.0 | | | | |
| | | | (d-8) Solvent Blue 104 (anthraquinone-based) | 12.0 | | | | |
| | | | (d-9) Solvent Violet 31 (anthraquinone-based) | 15.8 | | | | |
| | | | (d-1) Kayaset Black | 12.7 | | 0.1 | 0.2 | 0.1 |
| | | Coloring agent other than component (D) | Carbon black | | | | | |
| | | Silane coupling agent | A-187 | | | 0.15 | 0.15 | 0.15 |
| | | Defoamer | TSA720 | | | 0.05 | 0.05 | 0.05 |
| | | Sedimentation inhibitor | S-BEN | | | | | |
| | Second component (parts by mass) | (B) Acid anhydride | Me-HHPA: HN5500E | 12.5 | 168 | 21 | 21 | 23 |
| | | | Me-THPA: HN2200 | 13.0 | 166 | | | |
| | | | MHAC-P *[1] | 14.7 | 175 | | | |
| | | Curing accelerator | Kaolizer No. 20 | | | 0.2 | 0.2 | 0.2 |
| Evaluation | Composition | (A) Number of moles | | | mol | 0.067 | 0.067 | 0.075 |
| | | (B) Number of moles | | | mol | 0.125 | 0.125 | 0.137 |
| | | SP value of (A) and (B) mixture | | | $(cal/cm^3)^{1/2}$ | 11.66 | 11.66 | 11.97 |
| | | Maximum SP value of coloring agent | | | $(cal/cm^3)^{1/2}$ | 12.70 | 12.70 | 12.70 |
| | | Maximum difference between mixture SP value and coloring agent SP value | | | $(cal/cm^3)^{1/2}$ | 1.04 | 1.04 | 0.73 |
| | | Viscosity (first component, 70° C.) | | | dPa · s | 470 | 620 | 310 |
| | | Viscosity (mixture of first component and second component, 25° C.) | | | dPa · s | 72 | 88 | 43 |
| | | Solubility of coloring agent | | | — | Pass | Pass | Pass |
| | | Gelling time (140° C.) | | | sec | 360 | 360 | 360 |
| | | Sedimentation property of inorganic filler | | | — | Excellent | Excellent | Good |
| | Cured product | Color | | | — | Black | Black | Black |
| | | Color unevenness | | | — | Pass | Pass | Pass |
| | | Glass transition temperature | | | ° C. | 125 | 125 | 120 |
| | | Dielectric breakdown strength (25° C.) | | | MV/m | 30 | 30 | 30 |
| | | Volume resistivity (DC500 V, 25° C.) | | | MΩ · m | $1.6 \times 10^8$ | $1.6 \times 10^8$ | $1.6 \times 10^8$ |
| | Coil | Impregnation property | | | — | Excellent | Excellent | Excellent |
| | | Cracking resistance | | | — | Excellent | Excellent | Excellent |

| | | | | Examples | | | | |
|---|---|---|---|---|---|---|---|---|
| | | | | 4 | 5 | 6 | 7 | 8 |
| Composition | First component (parts by mass) | (A) Epoxy resin | jER828 (trade name) | 25.5 | 25.5 | 25.5 | 25.5 | 25.5 |
| | | | jER807 (trade name) | | | | | |
| | | (C) Inorganic filler | Crystalline silica: Crystalite CMC-12S | | 45 | 45 | 45 | 45 |
| | | | Fused silica: Fuselex E-2 | 45 | | | | |
| | | | Aluminum hydroxide | | 8 | 8 | 8 | 8 |
| | | (D) Coloring agent | (d-2) Solvent Red 146 (anthraquinone-based) | | | | | |
| | | | (d-3) Disperse Red 22 (anthraquinone-based) | | 0.025 | | 0.03 | |
| | | | (d-4) Solvent Yellow 163 (anthraquinone-based) | | 0.025 | 0.03 | | |
| | | | (d-5) Solvent Yellow 33 (quinophthalone-based) | | | | | |
| | | | (d-6) Solvent Green 3 (anthraquinone-based) | | 0.025 | 0.03 | | 0.05 |
| | | | (d-7) Solvent Green 5 (perylene-based) | | | | 0.03 | |

TABLE 1-continued

| | | | | | | | | |
|---|---|---|---|---|---|---|---|---|
| | | | (d-8) Solvent Blue 104 (anthraquinone-based) | | 0.025 | 0.03 | 0.03 | 0.05 |
| | | | (d-9) Solvent Violet 31 (anthraquinone-based) | | | | | |
| | | | (d-1) Kayaset Black | 0.1 | | | | |
| | | Coloring agent other than component (D) | Carbon black | | | | | |
| | | Silane coupling agent | A-187 | 0.15 | 0.15 | 0.15 | 0.15 | 0.15 |
| | | Defoamer | TSA720 | 0.05 | 0.05 | 0.05 | 0.05 | 0.05 |
| | | Sedimentation inhibitor | S-BEN | 0.2 | | | | |
| | Second component (parts by mass) | (B) Acid anhydride | Me-HHPA: HN5500E | 21 | 21 | 21 | 21 | 21 |
| | | | Me-THPA: HN2200 | | | | | |
| | | | MHAC-P *1 | | | | | |
| | | Curing accelerator | Kaolizer No. 20 | 0.2 | 0.2 | 0.2 | 0.2 | 0.2 |
| Evaluation | Composition | (A) Number of moles | | 0.067 | 0.067 | 0.067 | 0.067 | 0.067 |
| | | (B) Number of moles | | 0.125 | 0.125 | 0.125 | 0.125 | 0.125 |
| | | SP value of (A) and (B) mixture | | 11.66 | 11.66 | 11.66 | 11.66 | 11.66 |
| | | Maximum SP value of coloring agent | | 12.70 | 13.60 | 13.50 | 13.60 | 12.10 |
| | | Maximum difference between mixture SP value and coloring agent SP value | | 1.04 | 1.94 | 1.84 | 1.94 | 0.44 |
| | | Viscosity (first component, 70° C.) | | 370 | 470 | 480 | 460 | 370 |
| | | Viscosity (mixture of first component and second component, 25° C.) | | 45 | 71 | 72 | 68 | 57 |
| | | Solubility of coloring agent | | Pass | Pass | Pass | Pass | Pass |
| | | Gelling time (140° C.) | | 360 | 360 | 360 | 360 | 360 |
| | | Sedimentation property of inorganic filler | | Excellent | Excellent | Excellent | Excellent | Excellent |
| | Cured product | Color | | Black | Black | Black | Black | Black |
| | | Color unevenness | | Pass | Pass | Pass | Pass | Pass |
| | | Glass transition temperature | | 125 | 125 | 125 | 125 | 125 |
| | | Dielectric breakdown strength (25° C.) | | 30 | 30 | 30 | 30 | 30 |
| | | Volume resistivity (DC500 V, 25° C.) | | $1.6 \times 10^8$ | $1.6 \times 10^8$ | $1.6 \times 10^8$ | $1.6 \times 10^8$ | $1.6 \times 10^8$ |
| | Coil | Impregnation property | | Excellent | Excellent | Excellent | Excellent | Excellent |
| | | Cracking resistance | | Excellent | Excellent | Excellent | Excellent | Excellent |

| | | | | | Examples | | | |
|---|---|---|---|---|---|---|---|---|
| | | | | | 9 | 10 | 11 | 12 |
| | Composition | First component (parts by mass) | (A) Epoxy resin | jER828 (trade name) | 25.5 | 25.5 | 25.5 | 19.5 |
| | | | | jER807 (trade name) | | | | |
| | | | (C) Inorganic filler | Crystalline silica: Crystalite CMC-12S | 45 | 45 | 45 | 45 |
| | | | | Fused silica: Fuselex E-2 | | | | |
| | | | | Aluminum hydroxide | 8 | 8 | 8 | 8 |
| | | | (D) Coloring agent | (d-2) Solvent Red 146 (anthraquinone-based) | | | 0.1 | 0.1 |
| | | | | (d-3) Disperse Red 22 (anthraquinone-based) | 0.1 | 0.1 | | |
| | | | | (d-4) Solvent Yellow 163 (anthraquinone-based) | | | | |
| | | | | (d-5) Solvent Yellow 33 (quinophthalone-based) | | | | |
| | | | | (d-6) Solvent Green 3 (anthraquinone-based) | | | | |
| | | | | (d-7) Solvent Green 5 (perylene-based) | | | | |
| | | | | (d-8) Solvent Blue 104 (anthraquinone-based) | | | | |

TABLE 1-continued

| | | | | | | | |
|---|---|---|---|---|---|---|---|
| | | | (d-9) Solvent Violet 31 (anthraquinone-based) | | | | |
| | | | (d-1) Kayaset Black | | | | |
| | | Coloring agent other than component (D) | Carbon black | | | | |
| | | Silane coupling agent | A-187 | 0.15 | 0.15 | 0.15 | 0.15 |
| | | Defoamer | TSA720 | 0.05 | 0.05 | 0.05 | 0.05 |
| | | Sedimentation inhibitor | S-BEN | | | | |
| | Second component (parts by mass) | (B) Acid anhydride | Me-HHPA: HN5500E | 21 | | | 27 |
| | | | Me-THPA: HN2200 | | | 21 | |
| | | | MHAC-P *[1] | | 23.5 | | |
| | | Curing accelerator | Kaolizer No. 20 | 0.2 | 0.2 | 0.2 | 0.2 |
| Evaluation | Composition | (A) Number of moles | | 0.067 | 0.067 | 0.067 | 0.051 |
| | | (B) Number of moles | | 0.125 | 0.134 | 0.127 | 0.161 |
| | | SP value of (A) and (B) mixture | | 11.66 | 13.17 | 11.99 | 11.92 |
| | | Maximum SP value of coloring agent | | 13.60 | 13.60 | 15.00 | 15.00 |
| | | Maximum difference between mixture SP value and coloring agent SP value | | 1.94 | 0.43 | 3.01 | 3.08 |
| | | Viscosity (first component, 70° C.) | | 390 | 420 | 620 | 970 |
| | | Viscosity (mixture of first component and second component, 25° C.) | | 60 | 66 | 85 | 98 |
| | | Solubility of coloring agent | | Pass | Pass | Pass | Pass |
| | | Gelling time (140° C.) | | 360 | 360 | 360 | 360 |
| | | Sedimentation property of inorganic filler | | Excellent | Excellent | Excellent | Excellent |
| | Cured product | Color | | Red | Red | Red | Red |
| | | Color unevenness | | Pass | Pass | Pass | Pass |
| | | Glass transition temperature | | 125 | 125 | 125 | 115 |
| | | Dielectric breakdown strength (25° C.) | | 30 | 30 | 30 | 29 |
| | | Volume resistivity (DC500 V, 25° C.) | | $1.6 \times 10^8$ | $1.6 \times 10^8$ | $1.6 \times 10^8$ | $9.2 \times 10^7$ |
| | Coil | Impregnation property | | Excellent | Excellent | Excellent | Excellent |
| | | Cracking resistance | | Excellent | Excellent | Excellent | Marginal |

*[1]MHAC-P (mixture of methyl-3,6-endomethylene-1,2,3,6-tetrahydrophthalic anhydride and 3,6-endomethylene-1,2,3,6-tetrahydrophthalic anhydride)

TABLE 2

| | | | | SP Value | Molecular | Comparative Examples | | | |
|---|---|---|---|---|---|---|---|---|---|
| | | | | (cal/cm³)$^{1/2}$ | Weight | 1 | 2 | 3 | 4 |
| Composition | First component (parts by mass) | (A) Epoxy resin | jER828 (trade name) | 10.1 | 380 | 25.5 | 25.5 | 25.5 | 25.5 |
| | | | jER807 (trade name) | 11.0 | 340 | | | | |
| | | (C) Inorganic filler | Crystalline silica: Crystalite CMC-12S | | | 45 | 45 | 45 | 45 |
| | | | Fused silica: Fuselex E-2 | | | | | | |
| | | | Aluminum hydroxide | | | 8 | 8 | 8 | 8 |
| | | (D) Coloring agent | (d-2) Solvent Red 146 (anthraquinone-based) | 15.0 | | 0.1 | 0.025 | | |
| | | | (d-3) Disperse Red 22 (anthraquinone-based) | 13.6 | | | | 0.025 | |
| | | | (d-4) Solvent Yellow 163 (anthraquinone-based) | 13.5 | | | | 0.025 | |
| | | | (d-5) Solvent Yellow 33 (quinophthalone-based) | 15.0 | | | 0.025 | | |
| | | | (d-6) Solvent Green 3 (anthraquinone-based) | 12.1 | | | 0.025 | 0.025 | |
| | | | (d-7) Solvent Green 5 (perylene-based) | 12.0 | | | | | |

TABLE 2-continued

| | | | | SP Value (cal/cm³)^1/2 | Molecular Weight | Comparative Examples 1 | 2 | 3 | 4 |
|---|---|---|---|---|---|---|---|---|---|
| | | | (d-8) Solvent Blue 104 (anthraquinone-based) | 12.0 | | | 0.025 | | |
| | | | (d-9) Solvent Violet 31 (anthraquinone-based) | 15.8 | | | | 0.025 | |
| | | | (d-1) Kayaset Black | 12.7 | | | | | |
| | | Coloring agent other than component (D) | Carbon black | | | | | | 0.1 |
| | | Silane coupling agent | A-187 | | | 0.15 | 0.15 | 0.15 | 0.15 |
| | | Defoamer | TSA720 | | | 0.05 | 0.05 | 0.05 | 0.05 |
| | | Sedimentation inhibitor | S-BEN | | | | | | |
| | Second component (parts by mass) | (B) Acid anhydride | Me-HHPA: HN5500E | 12.5 | 168 | 21 | 21 | 21 | 21 |
| | | | Me-THPA: HN2200 | 13.0 | 166 | | | | |
| | | | MHAC-P *[1] | 14.7 | 175 | | | | |
| | | Curing accelerator | Kaolizer No. 20 | | | 0.2 | 0.2 | 0.2 | 0.2 |
| Evaluation | Composition | (A) Number of moles | | mol | | 0.067 | 0.067 | 0.067 | 0.067 |
| | | (B) Number of moles | | mol | | 0.125 | 0.125 | 0.125 | 0.125 |
| | | SP value of (A) and (B) mixture | | (cal/cm³)^1/2 | | 11.66 | 11.66 | 11.66 | 11.66 |
| | | Maximum SP value of coloring agent | | (cal/cm³)^1/2 | | 15.00 | 15.00 | 15.80 | — |
| | | Maximum difference between mixture SP value and coloring agent SP value | | (cal/cm³)^1/2 | | 3.34 | 3.34 | 4.14 | — |
| | | Viscosity (first component, 70° C.) | | dPa · s | | 620 | 520 | 600 | 620 |
| | | Viscosity (mixture of first component and second component, 25° C.) | | dPa · s | | 89 | 77 | 84 | 80 |
| | | Solubility of coloring agent | | — | | Pass | Pass | Pass | — |
| | | Gelling time (140° C.) | | sec | | 360 | 360 | 360 | 360 |
| | | Sedimentation property of inorganic filler | | — | | Excellent | Excellent | Excellent | Good |
| | Cured product | Color | | — | | Red | Black | Black | Black |
| | | Color unevenness | | — | | Fail | Fail | Fail | Pass |
| | | Glass transition temperature | | ° C. | | 125 | 125 | 125 | 125 |
| | | Dielectric breakdown strength (25° C.) | | MV/m | | 30 | 30 | 30 | 30 |
| | | Volume resistivity (DC500 V, 25° C.) | | MΩ · m | | $1.6 \times 10^8$ | $1.6 \times 10^8$ | $1.6 \times 10^8$ | $2.0 \times 10^7$ |
| | Coil | Impregnation property | | — | | Poor | Poor | Poor | Excellent |
| | | Cracking resistance | | — | | Poor | Poor | Poor | Excellent |

*[1]MHAC-P (mixture of methyl-3,6-endomethylene-1,2,3,6-tetrahydrophthalic anhydride and 3,6-endomethylene-1,2,3,6-tetrahydrophthalic anhydride)

It is clear that the epoxy resin compositions of the examples in which the difference between the SP value of the mixture of the epoxy resin (A) and the acid anhydride (B) and the SP value of the coloring agent (D) was within the specific range stipulated in the present disclosure exhibited excellent solubility of the coloring agent, favorable impregnation into the coil, and also an excellent insulating property. It is also clear that an ignition coil having excellent reliability is produced by using the epoxy resin composition.

REFERENCE SIGNS

A Coil
1 Center core
2 Outer core
3 Primary bobbin
4 Primary coil
5 Secondary bobbin
6 Secondary coil
7 Terminal
8 Igniter
9 Case
10 Epoxy resin composition
11 Magnet

The invention claimed is:

1. An epoxy resin composition comprising:
(A) an epoxy resin;
(B) an acid anhydride;
(C) an inorganic filler; and
(D) a coloring agent,
wherein a difference between a solubility parameter (SP value) of a mixture of the epoxy resin (A) and the acid anhydride (B) and a solubility parameter (SP value) of the coloring agent (D) as measured by Fedors method comprises less than 3.1 $[(cal/cm^3)^{1/2}]$,
wherein the SP value of the mixture of the epoxy resin (A) and the acid anhydride (B) comprises a weighted average of:
a solubility parameter (SP value) of the epoxy resin (A) as measured by Fedors method, and
a solubility parameter (SP value) of the acid anhydride (B) as measured by Fedors method, wherein the epoxy resin composition comprises a viscosity at 25° Celsius (° C.) along a range of 10 dPa·s to 100 dPa·s as measured by a B-type viscometer at a rotational speed of 1.5 rpm, wherein the epoxy resin composition comprises a total content of the epoxy resin (A), the acid anhydride (B), the inorganic filler (C), and the coloring agent (D) along a range of 80 mass % to 100 mass %, and a total content of one or more defoamers, antioxidants, and sedimentation inhibitors along a range of 0 mass % to 20 mass %.

2. The epoxy resin composition according to claim 1, wherein a ratio [(a)/(b)] of a number of epoxy groups (a) in the epoxy resin (A) to the number of acid anhydride groups (b) in the acid anhydride (B) is from 0.5 to 1.5.

3. The epoxy resin composition according to claim 1, wherein the solubility parameter (SP value) of the coloring agent (D) as measured by Fedors method is 16.0 or less.

4. The epoxy resin composition according to claim 1, wherein a cured product comprising the epoxy resin composition is black.

5. The epoxy resin composition according to claim 1, wherein the inorganic filler (C) comprises a metal hydroxide, and the metal hydroxide is aluminum hydroxide.

6. The epoxy resin composition according to claim 1, wherein the resin composition is a resin composition for an ignition coil.

7. An ignition coil insulated with a cured product of the epoxy resin composition of claim 1.

8. The epoxy resin composition according to claim 2, wherein the solubility parameter (SP value) of the coloring agent (D) as measured by Fedors method is 16.0 or less.

9. The epoxy resin composition according to claim 2, wherein the inorganic filler (C) comprises a metal hydroxide, and the metal hydroxide is aluminum hydroxide.

10. The epoxy resin composition according to claim 3, wherein the inorganic filler (C) comprises a metal hydroxide, and the metal hydroxide is aluminum hydroxide.

11. The epoxy resin composition according to claim 1, wherein the epoxy resin (A) is a bisphenol A type epoxy resin.

12. The epoxy resin composition according to claim 1, wherein the coloring agent of a compound (D) is at least one selected from an anthraquinone-based dye, a methine-based dye, an azomethine-based dye, a phthalocyanine-based dye, a quinone imine-based dye, a quinoline-based dye, and a nitro-based dye.

13. The epoxy resin composition according to claim 1, wherein the epoxy resin (A) comprise a 10 mass % or more of the epoxy resin composition to provide the viscosity.

* * * * *